United States Patent [19]

Vadetsky et al.

[11] 4,222,445
[45] Sep. 16, 1980

[54] REDUCTION UNIT OF DRILLING MOTOR

[76] Inventors: Jury V. Vadetsky, shosse Kosmonavtov, 131, kv. 31; Nikolai D. Derkach, ulitsa Samoletnaya, 56, kv. 24; Ernst N. Krutik, ulitsa Komissara Pozharskogo, 10, kv. 93; Georgy F. Chudakov, ulitsa Odoevskogo, 28, kv. 9; Nikolai P. Stroitelev, ulitsa Stakhanovskaya, 15, kv. 11, all of Perm; Alexandr P. Natarov, ulitsa akademika Pavlova, 130, kv. 38, Kharkov; Jury S. Vasiliev, Chernomorsky bulvar, 5, korpus 3, kv. 239, Moscow; Vladimir N. Andoskin, ulitsa Cherdynskaya, 22, kv. 216, Perm; Evgeny I. Ivanov, 2 Setunsky proezd, 4, kv. 150, Moscow, all of U.S.S.R.

[21] Appl. No.: 1,416

[22] Filed: Jan. 8, 1979

[51] Int. Cl.² .............................................. E21B 3/08
[52] U.S. Cl. .................................. 175/106; 64/27 CS; 74/467
[58] Field of Search ...................... 175/106, 227, 319; 64/27 CS; 74/467

[56] References Cited

U.S. PATENT DOCUMENTS

| 2,937,008 | 5/1960 | Whittle | 175/106 X |
| 3,669,199 | 6/1972 | Cullen et al. | 175/106 |
| 4,108,023 | 8/1978 | Garrison | 175/106 X |
| 4,121,476 | 10/1978 | Hammond | 64/27 CS X |

Primary Examiner—James A. Leppink
Attorney, Agent, or Firm—Steinberg and Blake

[57] ABSTRACT

In a reduction unit of a drilling motor comprising a casing, input and output shafts installed on supports, a reduction gear including sun and crown wheels, pinion carriers and planet pinions with supports located in a circular space between the wheels, an oil-filled chamber and a system of oil protection, there is provided a means eliminating the overloading of the reduction gear and a means eliminating the effect of torque fluctuations on the operation of the reduction gear while the supports of the input and output shafts installed on the ends of said shafts connected with the reduction gear are made in the form of articulated units taking axial loads and permitting angular displacements of the shafts, each of said shafts carrying a seal installed side by side with said support at the side opposite to the reduction gear, said seal being provided with a dividing space filled with a buffer fluid which protects said seal against contact with the drilling fluid.

17 Claims, 7 Drawing Figures

REDUCTION UNIT OF DRILLING MOTOR

The present invention relates to drilling industry and, more particularly, to the reduction units of drilling motors.

Most effectively the present invention will be employed for drilling deep oil and gas wells, though it will also prove useful in mining industry and in the field of construction.

The use of reduction units in drilling motors is not a novelty. One of the first turbodrills incorporated a planetary reduction gear installed between the operating element, i.e. turbine, and the supporting member intended to transmit the weight of drill pipes to the bit. The reduction gear was located in an oil-filled chamber. The chamber seals had the form of packed glands with intermediate metal rings. The basic disadvantages of the device were the absence of the means for reducing the pressure drop in the lubricator seals and a low durability of said seals under the specific working conditions of well bottom drilling. Hence, the efficiency of the reduction gear was very low and the service life failed to reach 10 hours even at a low power developed by one stage of the turbodrill.

The basic factors affecting the performance of the reduction unit in the course of drilling are as follows.

To ensure efficient functioning of the rock-breaking tool it is necessary to transmit high power and torque from the power generating elements to the well face at a limited diameter of the drilling motor. Thus, with the motor diameter of 195 mm the torque applied to the bit in the course of drilling amounts to 300–500 kgfm.

Due to the anisotropy of the drilled rock, the surface irregularities of the well face and the toothed surface of the bit cutters, the bit is subjected to heavy axial vibrations together with the drilling motor. This is accompanied by fluctuations of torque, the amplitude of said fluctuations reaching and even exceeding twice the value of the above-specified average torque. In the last case the bit, and consequently, the elements of the reduction gear may start rotating in the reverse direction.

Operation of the drilling motor is also accompanied by strong radial vibrations which cause bending of the basic motor parts, i.e. casings and shafts whose longitudinal dimensions are considerably longer than the lateral dimensions of the motor parts, this bringing about axial misalignment of the coupled motor shafts and heavy radial loads imposed on their supports.

The process of drilling presupposes the use of a drilling fluid containing hard abrasive particles which cause rapid wear of the reduction gear. When the reduction gear is sealed in an oil-filled chamber protected by seals, the seals proper become intensively worn. This process is aggravated by pulsations in the fluid pressure so that the particles contained in the fluid are periodically forced into the gaps between the seals.

The above-listed factors prove that neglect of any one of them cuts down the service life of the reduction unit; therefore provision of an efficient and durable reduction unit of a drilling motor can be achieved exclusively by a comprehensive solution of the problems posed by all these factors.

At present there is known a number of types of reduction units of a drilling motor.

Known in the previous art is a reduction unit of a drilling motor comprising a casing, input and output shafts mounted on supports, a planetary reduction gear accommodated in an oil-filled chamber provided with an oil-protection system consisting of face seals which are better adapted for face-drilling conditions than the packed glands. The input shaft is coupled with the reduction gear by a splined sleeve while the output shaft is connected to the pinion carrier of the planetary reduction gear by a screw joint. The channel for the drilling fluid has the form of central holes in the reduction unit shafts.

A disadvantage of this prior art reduction unit lies in that said unit can be employed only in such drilling motors whose actuating elements have an oil-protection system of their own, for example in electrodrills, because the reduction unit has no seal on the input shaft. The output shaft seal is also not adapted for operation in contact with hydraulic fluid so that the supporting member of the motor connected with the reduction unit output shaft must also be filled with oil which is not always warranted economically.

Another disadvantage of said prior art reduction unit lies in the necessity for additional devices intended to seal off the clearances between the reduction gear driving and driven shafts rotating at different speeds, and all the splined joints of the reduction unit shafts.

Known in the prior art is another reduction unit of a drilling motor comprising an input shaft and an output shaft, both mounted on supports, and a two-stage planetary reduction gear accommodated in an oil-filled chamber. The channel for the passage of the drilling fluid is made in the form of a circular space fitted around the oil-filled chamber which dispenses with the need for the seals between the driving and driven shafts of the reduction gear stages, rotating at different speeds. The planet pinions of the planetary reduction gear are installed rotatably on the shafts secured in the pinion carriers, the planet pinions of the second stage being twice as long than the planet pinions of the first stage.

A disadvantage of this reduction unit lies in that, like in the above-described device, its employment is confined to the drilling motors working in conjunction with oil-filled mechanisms because the reduction unit is devoid of the oil-protection system of its own. The use of this reduction unit in hydraulic drilling motors is impossible.

Another disadvantage of said reduction unit lies in that its input and output shafts are made integral with the parts of the reduction unit: the input shaft carries the sun wheel at one end while the output shaft is made integral with the 2nd stage pinion carrier, each shaft being mounted on two rigid supports. In this layout the parts of the unit are complicated in manufacture; moreover, in case of wear of the planetary reduction gear parts it becomes necessary to replace both the input and output shafts. Moreover, the working conditions of the gear drive are impaired because the elements of the planetary reduction gear fail to be self-adjusted so that the load is not distributed uniformly between the planet pinions. When the cantilever-mounted shafts of the reduction unit are connected with the shafts of the adjacent sections, their axial misalignment imposes heavy radial loads on the supports of the input and output shafts thus ruining said supports prematurely.

One more disadvantage of the prior art reduction unit lies in that the planet pinion supports are located in their inner holes which denies the possibility of changing their load capacity because the planet pinions have but limited radial dimensions. Apart from that, doubling the length of 2nd stage planet pinions of the reduction gear fails to ensure equal serviceability of both reduction gear stages because the torque of the 2nd stage increase roughly proportionally to the speed ratio of the 1st stage and said ratio for the planetary transmissions used in the prior art reduction unit is always higher than two.

The nearest technical solution is constituted by the prior art reduction unit of a drilling engine comprising a casing, input and output shafts mounted on supports, a reduction gear comprising sun and crown wheels, a planet carrier and planet pinions with supports located in a circular space between the wheels, an oil-filled chamber and a system of oil protection consisting of seals. The channel for the drilling fluid has the form of a circular space fitted around the oil-filled chamber on the outside.

A disadvantage of the prior art reduction unit lies in that its input and output shafts are mounted on rigid supports installed at short distances from one another and that there are long cantilevered portions of said shafts which imposes heavy radial loads on said supports and ruins them ultimately. This causes play in the shafts and disturbs the tightness of the seals.

Similarly to the above-described prior art reduction unit the planet pinion supports are located inside said pinions and there are no devices protecting the reduction gear against overloads and torque fluctuations.

Another disadvantage of the known reduction unit of a drilling motor lies in that the seals are in contact with the drilling fluid and are, therefore, rapidly worn so that the oil-protection system loses its tightness.

One more disadvantage of the prior art reduction unit lies in that its casing is made integral with the housing of the working elements which prevents the characteristics of the drilling motor to be adjusted with the same working elements by replacing a reduction unit by another one or by consecutively connecting several reduction units for changing the speed ratio of the reduction gear to suit the optimum conditions of drilling in each portion of the well.

The principal object of the present invention resides in providing a reduction unit which will reduce the rotation speed and increase the torque of hydraulic drilling motors.

Another object of the invention resides in extending the service life of the reduction unit of a drilling motor.

One more object of the invention resides in raising the load capacity of the reduction unit and its serviceability under the conditions of fluctuating torque.

Moreover, an object of the invention resides in simplifying the oil protection system of the reduction unit.

A further object of the invention resides also in providing a reduction unit which would permit changing the motor characteristics to obtain optimum drilling conditions.

These and other objects are accomplished by providing a reduction unit of a drilling motor, comprising a casing, input and output shafts mounted on supports, a reduction gear includings sun and crown wheels, pinion carriers and planet pinions with supports located in a circular space between the wheels, an oil-filled chamber and a system of oil protection composed of seals incorporated wherein, according to the invention, is a device safeguarding the reduction unit against overloads and a torque stabilizer eliminating the effect of torque fluctuations on the functioning of the reduction gear and wherein the supports of the input and output shafts installed on the ends thereof connected with the reduction gear are made in the form of articulated units taking axial loads and permitting angular displacement of the shafts, each of said shafts being provided with a seal located side by side with said support at the end opposite to the reduction gear, said seal being provided with a dividing space filled with a buffer fluid which protects said seal against contact with the drilling fluid.

It is practicable that the overload safeguard should comprise inserts accommodating the planet pinion supports installed in the slots of the pinion carrier and that part of each slot mating with the insert should have the form of a cylindrical surface whose axis is perpendicular to, and intersects, the longitudinal axis of the reduction gear.

It is advantageous that the surface of the insert mating with the pinion carrier be barrel-shaped while the surface located at the side of the pinion should be flat.

The inserts with the pinions are arranged in groups wherein the distances between the axes of the adjacent pinions within one group are shorter than the distances of the adjacent pinions included into different groups.

In one of the embodiments of the invention the pinions are arranged at the minimum possible distances within the groups.

It is expedient that the torque stabilizer eliminating the effect of torque fluctuations on the performance of the reduction gear be made in the form of a friction stage of the reduction gear, comprising a spring for compressing the friction elements with a predetermined force.

It is practicable that the articulated units of the input and output shafts be made in the form of spherical bearings.

It is likewise advisable that the input and output shafts be provided with additional supports connected with the casing by flexible elements. There is a version wherein the additional supports have the form of radial rubber-metal sliding-contact bearings.

It is expedient that the dividing space be limited by a seal, a tubular element connected to the casing, and a cover secured on the shaft, the tubular element with the casing forming a channel for the passage of the drilling fluid.

In one of the embodiments the dividing space has an additional seal made in the form of an elastic diaphragm, the portion of said diaphragm connected to the tubular element being located at the side of the seal while its opposite portion embraces the shaft for sealing it.

It is practicable that the density of the buffer fluid contained in the dividing space should be higher than that of the drilling fluid. In one of the embodiments it is suggested to use a lubricating fluid in the function of the buffer fluid.

It is also practicable that the dividing space in the reduction unit of the drilling motor should be in hydraulic communication with the oil-filled chamber and that the latter should contain a buffer fluid.

The substance of the present invention consists in that the devices for protecting the reduction gear against overloads and torque fluctuations, the supports of the input and output shafts in the form of articulated units, the arrangement of seals side by side with the supports and the provision of dividing spaces filled with a buffer fluid eliminate the adverse effect of the well-drilling conditions on the reduction unit and ensure its long service life.

The overload safeguard and the torque stabilizer allow the reduction gear to be used under diverse drilling conditions which depend on a large variety of factors such as the bit load, the moment capacity of the bit and rock, the rate of flow of the drilling fluid through and rock, the dynamic conditions at the well face. At a limited diameter of the drilling motor and, as a consequence, in absence of a considerable reserve in increasing the strength of the main load-bearing elements of the reduction gear the use of the above-listed means preserves the serviceability of the reduction gear under heavy overloads and torque fluctuations. However, sufficient durability of the reduction gear can be ensured only by operation in a lubricating fluid.

Making the supports of the input and output shafts installed at the ends of said shafts connected to the reduction gear in the form of articulated units which take axial loads and permit angular displacement of the shafts eliminates the radial loads on said supports when they are axially misaligned with the shafts of the working elements and of the support assembly intended to convey the weight of the drill pipes on to the bit. This ensures long operation of the supports in absence of radial and axial play. The installation of seals on the shafts side by side with the supports ensures but insignificant radial vibrations of the shafts in the seals which remain sufficiently tight under these conditions while the arrangement of the seals on the side of the shaft supports opposite to the reduction gear enables the support to be placed into the oil-filled chamber and thus to protect it against abrasive wear through contact with the drilling fluid. Thus, the design of the supports in the form of spherical joints and the arrangement of the seals relative to the supports according to the invention creates the best conditions for the functioning of both the seals and the supports of the input and output shafts.

The life of the seals is extended still further because each seal is provided with a dividing space filled with a buffer fluid which protects said seal from contact with the drilling fluid.

The location of the planet pinion supports in the inserts installed in the slots of the pinion carrier makes it possible to increase the size of these supports, thereby raising their load capacity. The surfaces of the carrier slots mating with the inserts have a cylindrical shape and their axes are perpendicular to and intersect the longitudinal axis of the reduction gear, thus ensuring self-adjustment and uniform loading of the pinion supports in case of high torques on the pinion carrier. This layout of the reduction gear overload safeguard improves the load distribution between the pinions since it ensures self adjustment of two elements of the planetary transmission, i.e. sun wheel and planet pinions which contributes to a longer life of the reduction gear train. The barrel-shaped surface of the insert ensures self-adjustment of the planet pinion supports in case of a certain axial misalignment between the axis of the planet pinion and the longitudinal axis of the reduction gear in a radial plane. The flat surface of the insert at the planet pinion side makes it possible to reduce the length of the assembly including the planet pinion with supports and inserts and thus to increase the load capacity of the reduction gear.

The arrangement of the inserts with planet pinions in groups wherein the distances between the axes of the adjacent planet pinions within one group are shorter than the distances between the axes of the adjacent planet pinions included into different groups likewise improves the load capacity of the reduction gear and the rigidity of the pinion carrier because, comparing with the uniform distribution of planet pinions in the circular space, this layout increases the moment of inertia and the moment of resistance of the pinion carrier in its section across the slots. The maximum effect is obtained if the adjacent planet pinions within the groups are installed at minimum possible axial distances.

The provision of the torque stabilizer in the form of a friction stage of the reduction gear comprising a spring for compressing the friction elements with a predetermined force makes it possible to prevent the transmission of peak torques to the reduction gear elements due to momentary slipping of the friction elements of said friction stage.

The supports of the input and output shafts of the reduction unit made in the form of spherical bearings ensure simultaneous transmission of the rotary motion of the shafts and compensation for the angular displacements of their axes.

Due to the arrangement wherein the additional supports of the input and output shaft are connected with the casing through flexible elements it is possible to ensure the required orientation of shaft axes during storage, transportation and assembly of the drilling motors. Such supports may be made in the form of radial rubber-metal sliding-contact supports.

Owing to the fact that the dividing space is limited by a seal, tubular element and cover secured on the shaft and that the tubular element forms, together with the casing, a channel for the passage of the drilling fluid, the buffer fluid is preserved longer in the dividing space because the kinetic energy of the fluid flow moving along the reduction unit is suppressed by the cover and the fluid is directed into said circular channel. The additional seal made in the form of an elastic diaphragm connected at the side of the seal to the tubular element while at the opposite side it embraces the shaft for sealing thereof during rotation, rules out the mixing of the buffer and drilling fluids.

The fact that the density of the buffer fluid filling the dividing space is higher than that of the drilling fluid prevents the so-called "floating" of the buffer fluid in the drilling fluid and rules out the contact between the fluid and the seal when the space contains the buffer fluid.

The lubricating material used as a buffer fluid improves the durability of the seals; in addition, penetration of the buffer fluid into the oil-filled chamber does not shorten the life of the reduction gear. This enables the dividing space to be used as a container for stand-by lubricant which makes up for the losses of the fluid from the oil-filled chamber, thereby dispensing with one of the least reliable units, i.e. lubricator. The use of the buffer fluid with lubricating properties permits hydraulic communication between the dividing space and the oil-filled chamber, when the latter is filled with the buffer fluid. This provides for maintaining a constant pressure in the chamber on changes in the working temperature, the high density of the buffer fluid hinders the penetration of the drilling fluid into the sealed units and the design of the oil-protection system is greatly simplified.

In the reduction units of a drilling motor realized according to the invention the employment of the overload safeguard and torque stabilizer and the improvement of the oil-protection system prolong the life of the unit under difficult well-drilling conditions. The independent system of oil protection and the casing of the reduction unit provide for its effective employment with any type of the drilling motor. For the practical purposes the present invention will be most useful in the form of a set of reduction units with different speed ratios which makes it possible to obtain any characteristic of the motor with the same working tools and motor supporting unit by changing or consecutively connecting several reduction units directly in the borehole.

Now the invention will be described in detail by way of example with reference to the accompanying drawings in which.

Figure 1:
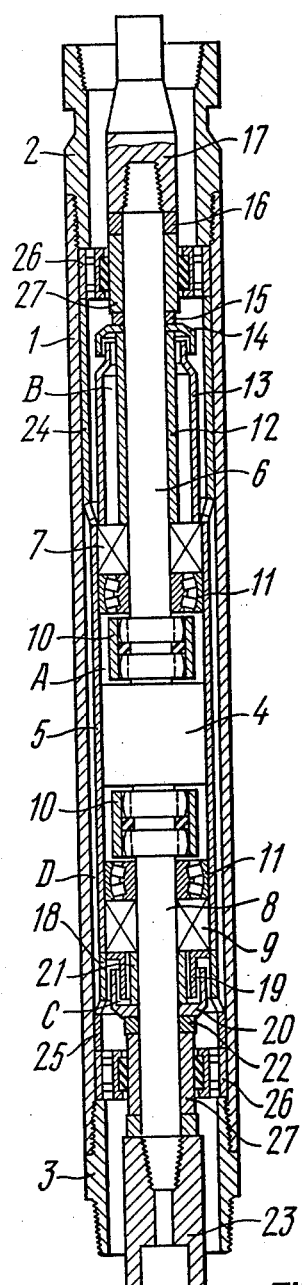
FIG. 1 is a schematic longitudinal section of the reduction unit of a drilling motor.

The reduction unit of a drilling motor, according to the invention, comprises a hollow cylindrical casing 1 (FIG. 1) connected with adapter sleeves 2 and 3 serving to fasten the reduction unit elements in the casing 1. A reduction gear 4 consisting of sun and crown wheels, pinion carriers and planet pinions with supports is accommodated in an oil-filled chamber A formed by a cylindrical housing 5, by an input shaft 6 with a seal 7 and an output shaft 8 with a seal 9. The reduction gear is connected with the input 6 and output 8 shafts by gear couplings 10. The articulated supports of the shafts 6 and 8 are made in the form of spherical roller bearings 11. The seals 7 and 9 are provided with dividing spaces B and C, respectively, filled with a buffer fluid which protects the seals from contact with the drilling fluid. The space B is limited by the seal 7, bushing 12, fixed immovably on the shaft 6, a tubular element 13 tightly secured to the housing 5 and located above the seal 7, and by a cover 14 installed above the tubular element 13 and secured on the shaft 6 by means of bushings 12, 15, 16 and coupling member 17 screwed on the threaded end of the shaft 6.

The dividing space C also comprises tubular elements 18 and 19 connected with the housing 5, and a cover 20 secured on the shaft 8 by bushings 21 and 22 with the aid of coupling member 23 screwed on the threaded end of the shaft 8. The buffer fluid contained in the spaces B and C is selected in order to satisfy the requirement of good adhesion to metal and absence of the tendency towards formation of chemical and mechanical compounds with the components of the drilling fluid. The buffer fluids are usually selected to have a density higher than that of the drilling fluid and to be lubricious in operation. The channel D intended for the passage of the drilling fluid is made in the form of a circular space between the casing 1 and associated bushings 24 and 25 at one side and the housing 5 and associated tubular elements 13 and 18 at the other.

The reduction unit is installed in the drilling motor in such a way that the adapter sleeve 2 is connected to the casing of the working tools while the adapter sleeve 3, to the casing of the motor supporting unit. Correspondingly, the shaft 6 is connected by the coupling member 17 with the driving shaft of the motor with a provision for transmitting torque while the shaft 8 is connected by the coupling member 23 in the same manner with the shaft of the motor supporting unit. Such a connection of the shafts permits relative axial displacement of the couplings without applying considerable axial forces to the spherical bearings 11; at the same time these connections play the role of additional supports for the shafts 6 and 8.

During operation of the drilling motor the shaft 6 is driven from the motor driving shaft; then rotation is further transmitted by the gear coupling 10 to the drive shaft of the reduction gear wherein the rotation speed is reduced with a corresponding increase of torque. Now rotation with new parameters is transmitted by the second gear coupling 10 to the output shaft 8 and further, via the coupling member 23 and the shaft of the supporting unit, to the rock-breaking tool (bit). Axial misalignment of the shafts 6 and 8 relative to the associated shafts of the adjacent units is made up for by the angular displacements of the axes of the reduction unit shafts 6 and 8 without applying radial forces to the supports due to the use of spherical supports 11. Thanks to the fact that the seals 7 and 9 are located near the supports 11, even the maximum possible range of angular displacements of the axes of the shafts 6 and 8 their radial play in the seals is very small (up to 0.2 mm) which is permissible for normal functioning of the seals utilized in the drilling motors. The absence of axial play in the supports 11 and an insignificant range of radial vibrations of the shafts 6 and 8 at the point of the seal ensure good conditions for long functioning of the seals which, in its turn, contributes to longer life of the supports 11 on the condition that lubricant is preserved for a long time in chamber A.

The dividing spaces B and C filled with buffer fluids rule out the contact of the seals 7 and 9 with the drilling fluid containing abrasive particles; besides, washing out of lubricant from the spaces by the drilling fluid is hindered due to the difference in the densities and other properties of the fluids mentioned before. The cover 14 protects the buffer fluid in the space against being washed out by the velocity head of the drilling fluid by reducing its kinetic energy and directing the flow into the circular channel D. When a sufficiently large amount of buffer fluid is accumulated in the space B the latter can also function as a device (lubricator) intended to make up for the losses of lubricant from the chamber A. The leaks occur mostly in the lower seal 9 because the drilling fluid loses a part of pressure in the channel D while pressure inside the oil-filled chamber A stays approximately constant which makes for the pressure differential on said seal at the side of the chamber A. The leaks decrease pressure in chamber A which is accompanied by a smaller pressure drop on the seal 9 and a larger pressure drop on the seal 7, said pressure drop being directed from the space B into the chamber A. Under the effect of this pressure drop the lubricious buffer fluid penetrates into the chamber A, compensating for the oil leaks. The buffer fluid may consist of thickened and heavy oils, consistent lubricants, plastic materials, and liquid metals and alloys. The buffer fluid must be selected so that its mixing with the lubricating material contained in the chamber A would not reduce the lubricating properties of both liquids. To replenish the reserve of lubricants in the chamber A and spaces B and C, the casing 1 has holes for valves and plugs (not shown in the drawings).

To improve orientation of the shafts 6 and 8 when the reduction units are transported in a horizontal position, also when they are installed in the drilling motor it is good pactice to provide said shafts with special radial supports connected with the casing 1 by flexible elements which reduce the radial loading of the supports in case of axial misalignment of the shafts being connected. In FIG. 1 said supports are shown in the form of rubber-metal radial sliding-contact bearings 26 with bushings 27 wherein the flexible elements are formed by rubber covering of the bearing 26.

Figure 2:
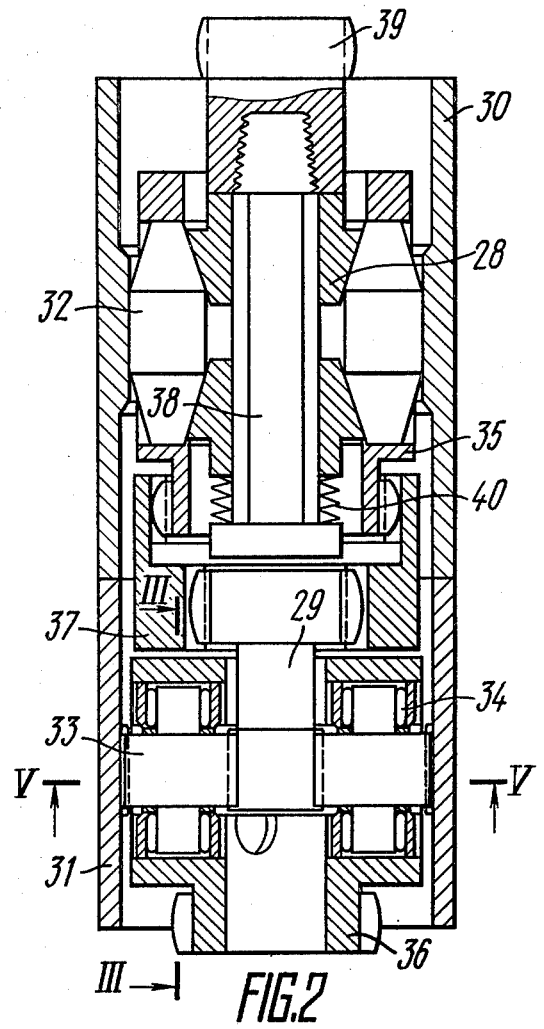
FIG. 2 shows an axial section through a planetary reduction gear.

The planetary reduction gear of the unit may have different designs and speed ratios depending on the requirements of efficiency of the drilling work. A version of the reduction gear 4 is shown in FIG. 2. It comprises the stages of the planetary gear train including sun wheels 28 and 29, crown wheels 30 and 31, planet pinions 33, 33 with supports 34, and pinion carriers 35 and 36. The gear stages are interconnected by torque-transmitting couplings 37 which can be either splined or gear type. The driving shaft 38 of the transmission is connected with the input shaft 6 via the coupling member 39 and coupling 10 (FIG. 1) while the driven shaft of the reduction gear-pinion carrier 36—is connected by the coupling 10 with the output shaft 8. The 1st friction stage of the reduction gear is made to function as a torque stabilizer i.e. a device eliminating the effect of torque fluctuations on the operation of the entire reduction gear. This is achieved by providing the friction stage with a spring 40 mounted on a shaft 38 and pressing the bevel sun wheels 28 against the tapered surfaces of the planet pinions 32 which, in turn, are pressed by the cylindrical surfaces against the crown wheel 30 connected with the reduction unit casing 1. The parameters of the spring 40 are such that the compression of the friction elements 28, 32, 30 ensures transmission of a maximum torque required for normal operation of the rock-breaking tool. When this torque starts fluctuating and its upsurges may ruin the reduction gear elements, the friction elements of the stage slip momentarily thus reducing the torque upsurge.

Figure 3:
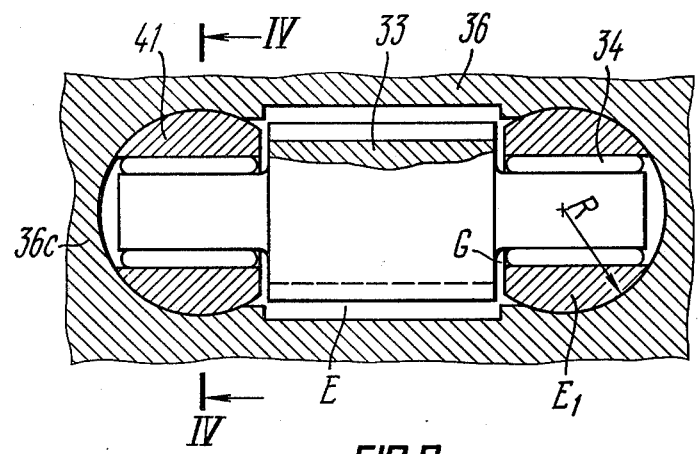
FIG. 3 is a section taken along line III—III in FIG. 2.
Figure 4:
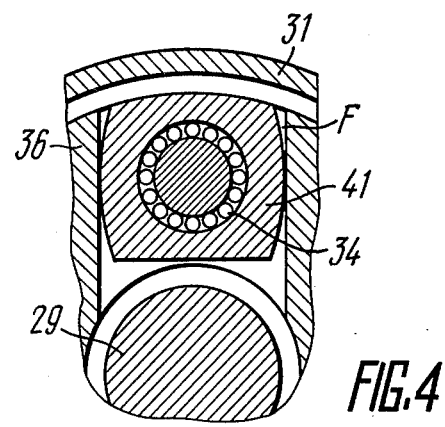
FIG. 4 is a section taken along line IV—IV in FIG. 3.
Figure 5:
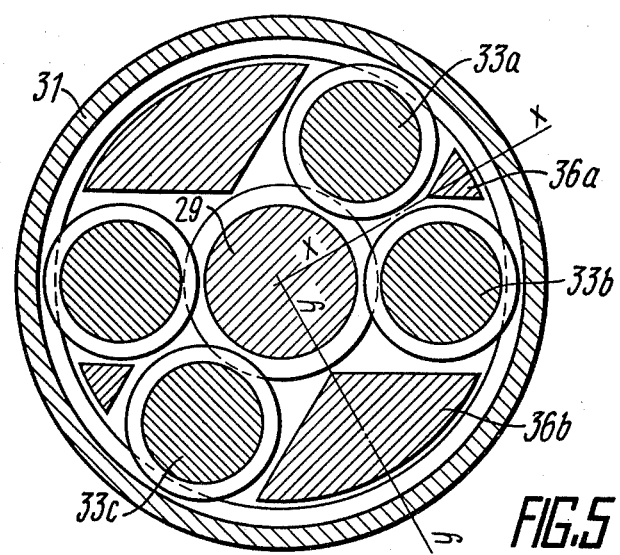
FIG. 5 is a section taken along line V—V in FIG. 2.

The 2nd toothed stage of the reduction gear incorporates an overload safeguard. It includes inserts 41 (FIGS. 3, 4) with the supports 34 of the planet pinions 33 which are installed in the slots E of the pinion carrier 36. The portion $E_1$ of each slot E mating with the insert 41 has the form of a cylindrical surface whose axis is perpendicular to the longitudinal axis of the reduction hear (coinciding with the axis of the sun wheel 29) and intersects it. The surface F of the insert 41 mating with the cylindrical surface of the slot E is barrel-shaped (FIG. 4). The surface G of the insert 41 (FIG. 3) facing the planet pinion 33 is flat. The planet pinions 33 with supports 34 and inserts 41 are located in the circular space between the sun wheel 29 and the crown wheel 31 irregularly, in groups (FIG. 5) so that the distances between the axes of the adjacent planet pinions 33a and 33b within one group are shorter than the distances between the axes of the adjacent planet pinions 33b and 33c included into different groups. Accordingly, the cross sectional areas and the moments of resistance of the pinion carrier elements 36a and 36b are different too.

All the above-mentioned distinguishing features of the toothed stage of the reduction gear are aimed at raising the load capacity of the wearest reduction gear elements such as supports 34, planet pinions 33 and pinion carrier 4. Thus, their load capacity rises sufficiently for transmitting the torque ensuring normal functioning of the drilling bit. When torque is transmitted via the reduction gear 4, its pinion carrier 36 is twisted relative to the longitudinal axis, the carrier elements 36a and 36b (FIG. 5) bend with respect to axes X—X and Y—Y which is accompanied by turning of the shafts of the planet pinions 33 (FIG. 3) through a certain angle. The arrangement of the reduction gear 4 in accordance with the present invention raises the total moment of resistance of the carrier elements 36a and 36b in comparison with the reduction gear whose planet pinions are spaced regularly and uniformly in the circular space. The maximum effect is achieved when the planet pinions 33a and 33b are contiguous to each other (FIG. 5)., i.e., when the axis-to-axis distances of the planet pinions 33a and 33b are minimum and meet all the requirements of assembling the planetary transmission. The stresses in said elements of the pinion carrier are reduced still more because a considerable radius R (FIG. 3) of the cylindrical surface practically excludes stress concentrations at the junctions between the longitudinal 36a and transverse 36c elements of the pinion carrier. The flat shape of the surfaces G makes it possible to reduce the total length of the slot E 2 which contributes to higher strength and stiffness of the pinion carrier. At the same time, installation of the planet pinion supports 34 in the inserts 41 permits increasing their diameters and longitudinal loading as compared with the versions in which the supports are located inside the planet pinions. The operating conditions of the supports 34 are made still better due to the barrel-like shape of the insert 41 which permits the supports 34 to be self-adjusted if the shaft of the planet pinions 33 is misaligned in two mutually perpendicular planes.

Figure 6:
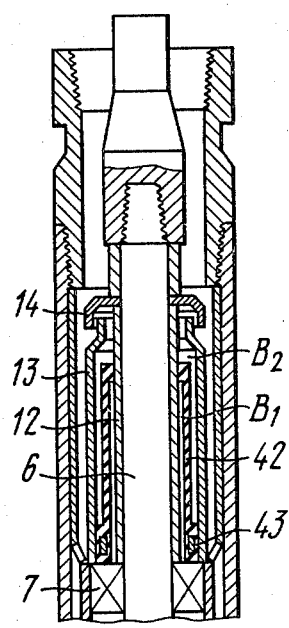
FIG. 6 is a longitudinal section of a part of the reduction unit with an embodiment of the dividing chamber.

A version of the dividing space B (FIG. 6) incorporates an auxiliary seal in the form of an elastic diaphragm 42. One side of the diaphragm 42 is reinforced by metal rings 43 which allows the diaphragm 42 to be press-fitted into the tubular element 13. At the other side the diaphragm fits around the bushing 12 secured on the shaft 6 with an interference of 5–7 mm for sealing said bushing but permitting the shaft 6 to rotate together with said bushing 12. This auxiliary seal divides the space B into two parts $B_1$ and $B_2$. The space $B_1$ accommodates a lubricating buffer fluid while the buffer fluid in the space $B_2$ is gradually substituted by the drilling fluid. As the fluid gradually escapes from the chamber A the lubricant is replenished from the space $B_1$. An advantage of this version lies in a longer preservation of the buffer fluid in the space B.

Figure 7:
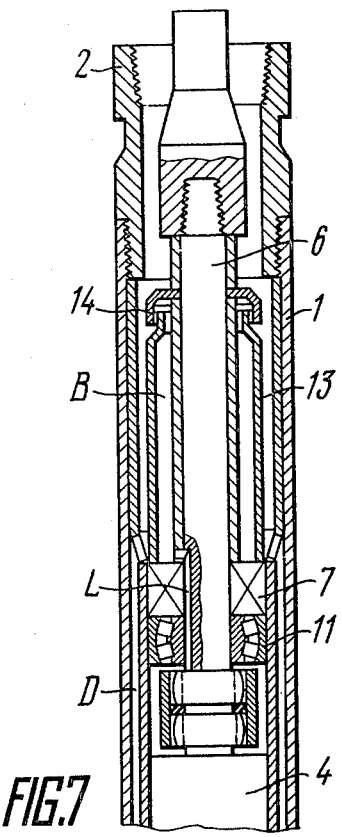
FIG. 7 is a longitudinal section of one of the embodiments of the reduction unit.

The version of the reduction unit of a drilling motor (FIG. 7) differs from the basic version (FIG. 1) in that the dividing space B communicates hydraulically through channel L with the oil-filled chamber A which accommodates the reduction gear 4 and supports 11: the chamber A, like the chamber B, is filled with a lubricious buffer fluid. In such an arrangement the pressure of the drilling fluid is conveyed from the space B into the chamber A through channel L. When the fluid volume changes in the chamber A due to thermal variations and the fluid flows back and forth through channel L, pressure in said chamber remains unchanged so that the seal 7 is practically free from the effect of pressure drop. Its functions consist only in preventing the settling solid particles from entering the chamber A when the fluid located in the upper part of the space B above the buffer fluid is not cleaned sufficiently well. Therefore, the design of the seal 7 is simpler than it is in the basic version. (FIG. 1). For example it has the form of an edge-type labyrinth gate. The reduction unit of a drilling motor according to this layout (FIG. 7) is extremely simple, sufficiently reliable and durable.

The use of the above-described technical solutions has made it possible to work out a simple and dependable design of the reduction unit of a drilling motor which allows efficient drilling of wells with various types of drilling motors, practically at any depth attainable today with the current hydraulic equipment of the drilling rigs. The self-sufficiency of the unit and its oil protection system permit its use in the form of a set of several reduction units ensuring a series of speed ratios capable of providing a wide range of performance characteristics required by diverse drilling conditions without changing the working elements and motor supporting units. Said units can be furnished to the drilling rig in a set while the required characteristic of the motor can be determined directly at the borehole by replacing or consecutively combining several reduction units.

What is claimed is:

1. A reduction unit of a drilling motor installed between the working tool assembly and the drilling motor supporting assembly, comprising: a casing; adapter sleeves for connecting said casing with the housings of the working tool assembly and supporting assembly; a reduction gear with sun and crown wheels, pinion carriers and planet pinions with supports located in a circular space between the wheels; an overload safeguard preventing overloading of the reduction gear; a torque stabilizer eliminating the effect of torque fluctuations on operation of the reduction gear; input and output shafts of the reduction unit intended to transmit torque from the shaft of the working tool assembly to the reduction gear and from the reduction gear to the supporting assembly shaft; connecting elements in the form of couplings installed on said input and output shafts, intended to transmit torque and permitting relative axial displacements and axial misalignment of the connected shafts; supports of said input and output shafts installed on the ends of said shafts connected with the reduction gear and made in the form of an articulated unit taking axial loads and permitting angular displacements of the shafts; an oil-filled chamber accommodating said reduction gear, the overload safeguard of the reduction gear, the torque stabilizer thereof and the shaft supports, said chamber being secured on said casing so that the external surface of said chamber forms, together with the internal surface of the casing, a circular channel for the drilling fluid; and an oil protection system with seals installed on each of said input and output shafts side by side with their supports at the side opposite to the reduction gear, the seals incorporating dividing spaces filled with a buffer fluid which protects said seals from contact with the drilling fluid.

2. A reduction unit of a drilling motor according to claim 1 wherein the overload safeguard comprises inserts with planet pinion supports located therein, said inserts being installed in the slots of the pinion carrier so that the part of each slot mating with the insert is made in the form of a cylindrical surface whose axis is perpendicular to, and intersects, the longitudinal axis of the reduction gear.

3. A reduction unit of a drilling motor according to claim 2 wherein the surface of the insert mating with the pinion carrier is barrel-shaped.

4. A reduction unit of a drilling motor according to claim 2 wherein the surface of the insert located at the side of the planet pinion is flat.

5. A reduction unit of a drilling motor according to claim 3 wherein the surface of the insert located at the side of the planet pinion is flat.

6. A reduction unit of a drilling motor according to claim 2 wherein the inserts with planet pinions are arranged in groups in which the distances between the axes of the adjacent planet pinions within one group are shorter that the distances between the axes of the adjacent planet pinions included into different groups.

7. A reduction unit of a drilling motor according to claim 6 wherein the adjacent planet pinions in the groups are contiguous with each other.

8. A reduction unit of a drilling motor according to claim 1 wherein the torque stabilizer eliminating the effect of torque fluctuations on the operation of the reduction gear is made in the form of a friction stage of the reduction gear, comprising a spring designed to compress the friction elements with a predetermined force.

9. A reduction unit of a drilling motor according to claim 1 wherein the articulated units are made in the form of spherical bearings.

10. A reduction unit of a drilling motor according to claim 1 wherein the input and output shafts are provided with additional supports connected to the casing by flexible elements.

11. A reduction unit of a drilling motor according to claim 10 wherein the supports connected to the casing by flexible elements are made in the form of radial rubber-metal sliding-contact bearings.

12. A reduction unit of a drilling motor according to claim 1 wherein each dividing space is limited by a seal, by a tubular element connected with the casing, and by a cover mounted on the shaft, said tubular element forming, together with the casing, a channel for the drilling fluid.

13. A reduction unit of a drilling motor according to claim 12 wherein the dividing space has an auxiliary seal in the form of an elastic diaphragm, the portion of said diaphragm connected to the tubular element being located at the side of the seal while its opposite portion fits around the shaft for sealing the latter.

14. A reduction unit of a drilling motor according to claim 1 wherein the density of the buffer fluid filling the dividing spaces are higher than the density of the drilling fluid.

15. A reduction unit of a drilling motor according to claim 14 wherein the buffer fluid is constituted by a lubricating fluid.

16. A reduction unit of a drilling motor according to claim 1 wherein the dividing spaces are in hydraulic communication with the oil-filled chamber which is also filled with the buffer fluid.

17. A reduction unit of a drilling motor according to claim 15 wherein the dividing spaces are in hydraulic communication with the oil-filled chamber which is also filled with the buffer fluid.

* * * * *